United States Patent
Bellaton et al.

(10) Patent No.: US 11,221,283 B2
(45) Date of Patent: Jan. 11, 2022

(54) SAMPLE HOLDER ARRANGEMENT

(71) Applicant: ANTON PAAR TRITEC SA, Peseux (CH)

(72) Inventors: Bertrand Bellaton, Neuchâtel (CH); Marcello Conte, Neuchâtel (CH)

(73) Assignee: ANTON PAAR TRITEC SA, Peseux (CH)

( * ) Notice: Subject to any disclaimer, the term of this patent is extended or adjusted under 35 U.S.C. 154(b) by 777 days.

(21) Appl. No.: 16/070,649

(22) PCT Filed: Jan. 19, 2017

(86) PCT No.: PCT/EP2017/051035
§ 371 (c)(1),
(2) Date: Jul. 17, 2018

(87) PCT Pub. No.: WO2017/125466
PCT Pub. Date: Jul. 27, 2017

(65) Prior Publication Data
US 2021/0208038 A1    Jul. 8, 2021

(30) Foreign Application Priority Data

Jan. 19, 2016    (EP) .................................... 16151845

(51) Int. Cl.
*G01N 3/04* (2006.01)
*G01N 3/42* (2006.01)

(52) U.S. Cl.
CPC ................ *G01N 3/04* (2013.01); *G01N 3/42* (2013.01)

(58) Field of Classification Search
CPC .................................... G01N 3/04; G01N 3/42
USPC ............................................................. 73/81
See application file for complete search history.

(56) References Cited

U.S. PATENT DOCUMENTS

| 2,713,259 A | 7/1955 | Grodzinski et al. |
| 3,866,476 A | 2/1975 | John |
| 4,575,869 A * | 3/1986 | Torrisi ................. G01N 23/083 378/47 |

(Continued)

FOREIGN PATENT DOCUMENTS

| CN | 103852423 | 6/2014 |
| DE | 102010037982 | * 4/2012 |

(Continued)

*Primary Examiner* — Octavia Hollington
(74) *Attorney, Agent, or Firm* — Duane Morris LLP; Gregory M. Lefkowitz

(57) ABSTRACT

Sample holder for a material testing device, said sample holder comprising: —a holder body having an end face defining a plane; —a sample plate arranged at said end face of the holder body and arranged to receive a sample; —a clamping arrangement. According to the invention, said clamping arrangement comprises a clamping ring comprising:—a cylindrical portion sized to fit over said holder body; —an annular flange extending inwardly from an extremity of the cylindrical portion; —a plurality of resilient tongues extending inwardly from said annular flange; —a plurality of helical slots distributed around the cylindrical portion and each arranged to interact with a corresponding stud provided on said holder body, each helical slot comprising a plurality of notches provided at the edge of the slot situated away from the flange.

20 Claims, 3 Drawing Sheets

(56) References Cited

U.S. PATENT DOCUMENTS

| | | | |
|---|---|---|---|
| 6,965,112 B2 * | 11/2005 | Moriya | H01J 37/20 |
| | | | 250/442.11 |
| 7,241,994 B2 | 7/2007 | Riken | |
| 7,568,381 B2 | 8/2009 | Smith et al. | |
| 7,656,075 B2 * | 2/2010 | Voigtlander | G01Q 10/04 |
| | | | 310/333 |
| 7,685,868 B2 | 3/2010 | Woirgard et al. | |
| 8,777,201 B2 * | 7/2014 | Dagenais | B23K 37/0276 |
| | | | 269/37 |
| 9,496,099 B2 * | 11/2016 | McMahon | G01N 35/10 |
| 2017/0336308 A1 | 11/2017 | Bellaton et al. | |

FOREIGN PATENT DOCUMENTS

| | | |
|---|---|---|
| JP | 2004 271318 | 9/2004 |
| JP | 2011 237366 | 11/2011 |

\* cited by examiner

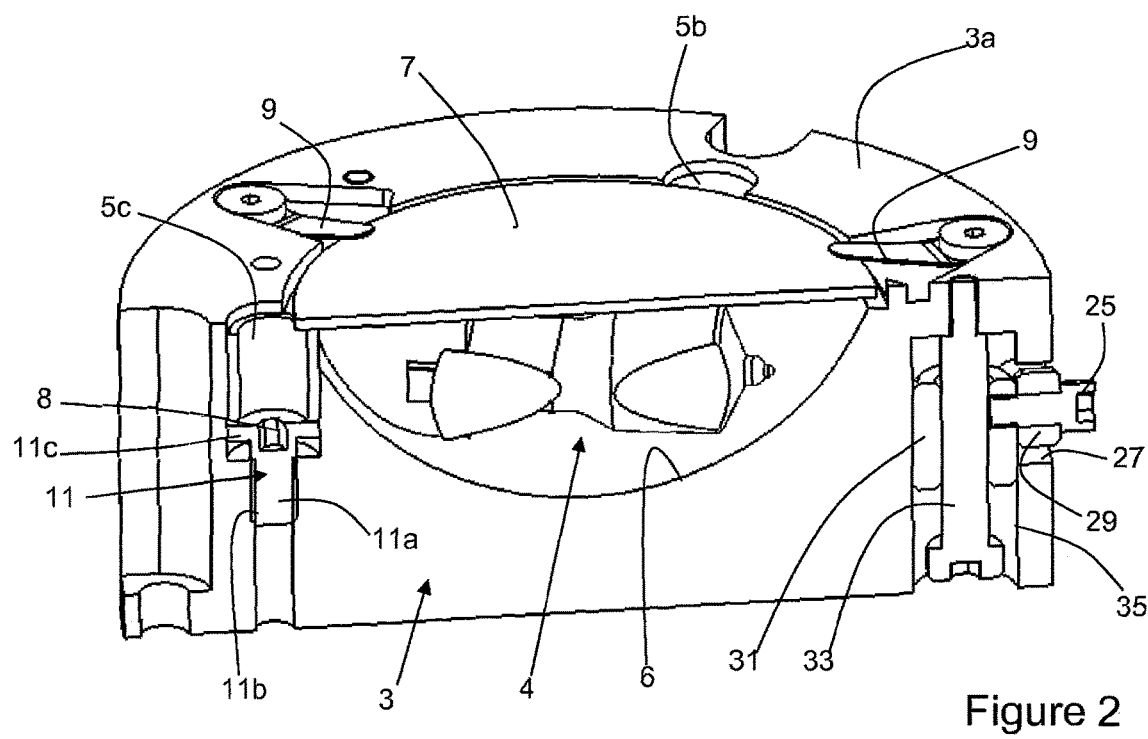
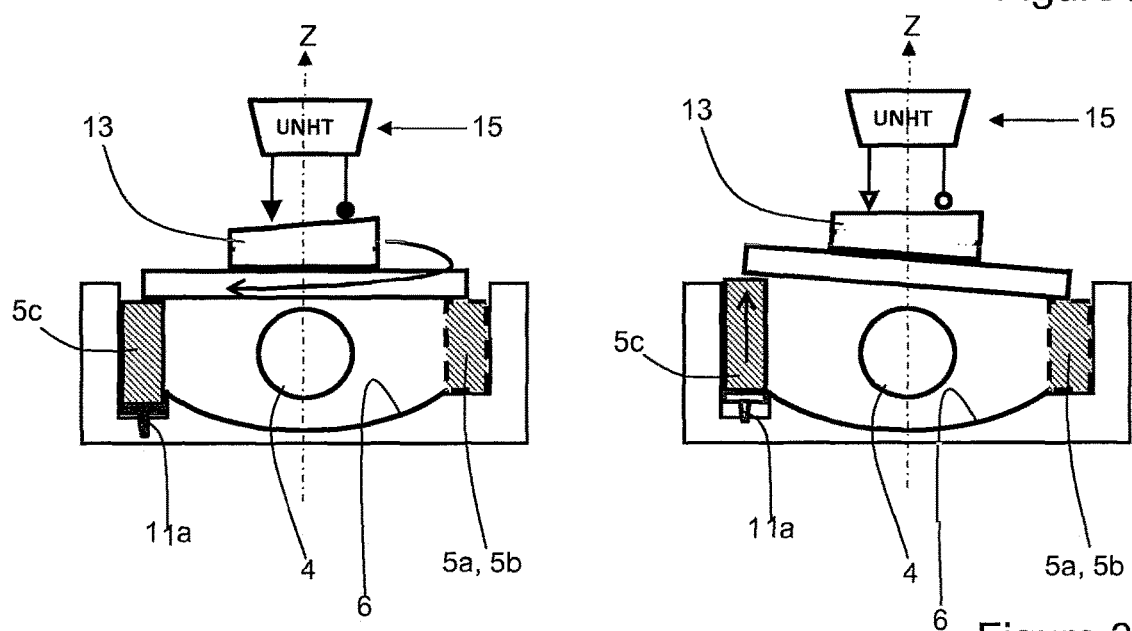
Figure 2
Figure 3

SAMPLE HOLDER ARRANGEMENT

CROSS-REFERENCE TO RELATED APPLICATIONS

This application is a § 371 national stage entry of International Application No. PCT/EP2017/051035, filed Jan. 19, 2017, which claims priority to European Patent Application No. 16151845.1, filed Jan. 19, 2016, the entire contents of which are incorporated herein by reference.

TECHNICAL FIELD

The present invention relates to the field of materials testing systems. In particular, it relates to a sample holder for supporting samples for indentation or scratch testing.

STATE OF THE ART

In indentation testing, which includes not only simple axial indentation but also scratch testing and tribological testing, sample holders are provided which hold the sample to be tested facing an indenter stylus which is then brought into contact with the sample under application of an axial force, typically perpendicular to the surface of the sample. In their simplest form, these can simply be a block upon which the sample is glued, bolted or clamped, the upper surface of the block extending in a plane substantially perpendicular to the axis of the indenter stylus. Examples of such simple arrangements are given in EP1674850, US2008028840, EP1482297 and JP2004271318. In practice, existing sample clamping arrangements can be difficult to use, particularly in high-temperature indentation testing when they can come loose or over-stress the sample due to differential heating of the various components.

It is often desired to indentation test material samples at elevated temperatures, and as a result heated sample holders have been proposed, such as in co-pending application EP14191443.2 in the name of the present applicant. Such heated sample holders typically comprise a heating arrangement located underneath the sample, which is glued or clamped on a plate of thermally-conductive material above an infrared emitter and a corresponding reflector.

However, all of the above-mentioned arrangements of the prior art require that the sample be prepared with absolutely parallel faces, so that, when placed on the sample holder, its upper surface is substantially perpendicular to the axis of the indenter stylus (i.e. perpendicular to the "Z" direction and thus extending in the plane XY as commonly defined), otherwise the results will be influenced by the slant of the surface, inducing errors in the data obtained. Indeed, a scratch test on a surface which is not parallel to the XY plane is of dubious worth. Even worse, in the case of a dual-stylus-type arrangement with a reference probe and an indenter probe such as in the materials testing machine of EP1674850, a slanted surface can result in the reference probe meeting the surface at a different "Z" value than the indenter stylus.

The document JP2011-237366 discloses a sample preparation device which comprises a system for tilting a sample holder in order to level the surface of the sample. An automated system using surface measurements gained while rotating the sample positions this latter as horizontally as possible by adjusting the actuators, and then the sample is cut with an appropriate tool to make sure that its surface is level. This cutting unfortunately removes any surface treatment (e.g. a coating, tempering etc.) that may be have been carried out on the sample, preventing measurements to be made of the results of the treatment. Furthermore, this system is overly complex, and requires complicated computer-controlled actuators in its construction and operation. Also, this document does not disclose how the sample plate is attached to the actuators, and it must be supposed that this arrangement is complex and expensive, since the sample must be rotatable.

The document CN 103 852 423 discloses a tiltable sample holder for optical measurement purposes at cryogenic temperatures. The arrangement disclosed in this document comprises a series of adjustable plates serving to position a sample holder. This sample holder has a hemispherical boss in its centre, upon which it pivots under the control of four bolts which pass through the sample holder and into corresponding threaded bores on the underlying plate, upon which the boss rests. By screwing in and out opposing pairs of bolts, the angle of the sample holder can be adjusted around two axes of rotation. However, the use of such bolts requires that one of each pair be screwed in and the other to be screwed out, which risks flexing or breaking the sample holder plate if one or more of the bolts are over-tightened, or risks leaving the sample plate loose if the bolts are under-tightened. Furthermore, the bolts are made of nylon, which, while convenient for cryogenic testing, is not suitable for use at higher temperatures due to softening of the material, and is not suitable for material testing in which significant forces are applied to the sample since nylon is relatively compressible. As a result, the arrangement of this document is only suitable for optical measurements at cryogenic temperatures, and not the full spectrum of materials testing, such as indentation and/or scratch testing, particularly at elevated temperatures.

In all of the above-mentioned documents, the sample is attached to the sample holder by conventional means, which are often inconvenient, particularly (but not only) when the sample holder is to be subjected to a large increase in temperature. Such a change in temperature can result in conventional attachments means becoming loose. A first aim of the present invention is thus to propose a sample holder for a materials testing device provided with a clamping arrangement which is simple and easy to use, and can accommodate a variety of sample sizes.

A further aim of the present invention is thus to overcome the above-mentioned issues with the prior art, and thus to propose a sample holder for a materials testing device which can be used with samples exhibiting non-parallel faces in a manner suitable for use with a wide range of materials testing methodologies, and at low, room and high temperatures.

DISCLOSURE OF THE INVENTION

More specifically, the first aim of the invention is solved by a sample holder for a material testing device, said sample holder comprising a holder body having an end face defining a plane, a sample plate arranged at said end face of the holder body and arranged to receive a sample, and a clamping arrangement.

According to the invention, the clamping arrangement comprises a clamping ring comprising a cylindrical portion sized to fit over said holder body, an annular flange extending inwardly from an extremity of the cylindrical portion so as to form a hollow structure, and a plurality of resilient tongues extending inwardly from said annular flange. These tongues may be shaped so as to come into contact with the sample and/or the sample plate so as to apply a clamping force thereto.

Furthermore, a plurality of helical slots are distributed around the cylindrical portion of the clamping ring, each being arranged to interact with a corresponding stud provided on said holder body, each helical slot comprising a plurality of notches provided an the edge of the slot situated away from the flange. The slots may be provided through the whole thickness of the cylindrical portion or as a groove in the inner face thereof.

As a result, by slipping the clamping ring over the holder body, engaging the studs in the slots and pressing it down while turning, pressure can be applied by the resilient tongues to the sample and/or to the sample plate to clamp it in place. The notches engage with the studs and thereby prevent the clamping ring from turning and thus from loosening in use. In case of a high-temperature use of the sample holder, since the clamping force is provided resiliently rather than rigidly, undesired loosening of the clamping arrangement in use can be avoided.

Advantageously, each of said plurality of helical slots extends through the entire thickness of said cylindrical portion, which is simple to machine.

Advantageously, each of said studs is adjustably arranged in a corresponding slot in the holder body, said slot extending perpendicular to said plane, so as to permit adjusting the vertical position of each stud. To this end, each of said studs may be mounted to a bushing threaded onto a bolt situated in a cavity provided in said holder body, said bolt extending along the corresponding cavity in a direction perpendicular to said plane. Simply turning the bolt thus causes the stud to displace along its slot.

Advantageously, the holder body is hollow and comprises a reflector facing said sample plate and at least one heating element situated between said reflector and said sample plate. Heating of the sample is thus possible.

The second aim of the invention is attained a sample holder for a material testing device, said sample holder comprising a holder body having an end face defining a plane, a sample plate arranged at said end face of the holder body and arranged to receive a sample, and at least three supports disposed around the end face of the holder body and arranged to support the sample plate thereupon, e.g. with the sample plate resting on the ends of the supports. These supports may be cylindrical pins, ball bearings, surfaces provided in/on the holder body, or any other convenient arrangement or combination thereof. At least one of said supports is an adjustable support arranged to be adjustable in position with respect to said holder body in a direction perpendicular to said plane. Since one of the supports can be moved up and down, the sample plate can be tilted so as to compensate the slant of the surface of a sample with non-parallel faces and thus ensure that an indenter probe (and a corresponding reference probe, if present) meet(s) the surface of the sample in an absolutely perpendicular fashion.

According to the invention, at least one retaining element is provided on the holder body, said retaining element being arranged to retain the sample plate against said supports. This arrangement, which is distinguished from the device of CN 103 852 423 in which the adjustable bolts are themselves supports which pass through and directly hold the sample plate, prevents this latter from either being loose, or from being over-stressed as can occur e.g. by misapplication of the bolts of the document mentioned previously. A loose sample plate supported at four or more points can rock and thus make accurate measurements impossible, and an over-stressed sample plate can either bend, again preventing accurate measurements, or can even break. The arrangement of the invention eliminates these issues by holding the sample plate against the supports. The sample holder of the invention is thus simpler to use, and is less likely to be operated incorrectly than the arrangements of the prior art, which increases measurement accuracy as a result.

This retaining element may be arranged to permit the sample plate to be rotated under friction, enabling the operator to manually turn the sample plate so as to position the thinnest portion of the sample in line with the adjustable support. Such a retaining element may for instance be a spring clip, however other clamping arrangements are possible.

Advantageously, exactly three supports are provided, which provides a statically-determinate arrangement and thus prevents undesired tipping of the sample plate on the supports, and exactly one of these three supports is adjustable as described above. The other two non-adjustable supports may advantageously have their upper surfaces situated in substantially the same plane, and may be factory set accordingly with no provision for user-adjustment.

Advantageously, the adjustable support is threaded into said holder body and arranged so as to be adjusted by screwing said adjustable support in or out. A simple, easily-produced adjustable support is therefore provided.

Advantageously, the adjustable support is formed as a blind tube at an end thereof intended to support the sample plate (i.e. the upper end thereof), an engagement portion for a tool being provided at the inner extremity of said tube. Alternatively, the adjustable support may be formed as a tube resting upon a bolt, said bolt being likewise provided with an engagement portion for a tool. By situating the engagement portion (be it a screw slot, a hex or Torx cavity or similar) in such a recessed manner with respect to the upper face of the adjustable support, the risk of damaging the end face of the adjustable support is limited compared to simply providing the engagement portion at its end face. Damage to such an end face is undesirable since it is this end face which comes into contact with the sample plate, and any burring of this surface is clearly likely to be problematic.

Advantageously, said holder body is hollow and comprises a reflector facing said sample plate and at least one heating element situated between said reflector and said sample plate. Heating of the sample is thus possible.

The sample holder may comprise both the adjustable support and the clamping arrangement of the invention in combination.

Finally, the invention relates to an indentation test machine comprising a sample holder according to any of the embodiments discussed above.

BRIEF DESCRIPTION OF THE DRAWINGS

Further details of the invention will become clear upon reading the following description in conjunction with the appended figures, in which:

FIG. 2 is a sectional view of the sample holder along line A-A of FIG. 1, the clamping ring having been removed;

FIG. 3 is a schematic of the principle of the adjustable support;

EMBODIMENT OF THE INVENTION

Figure 1:
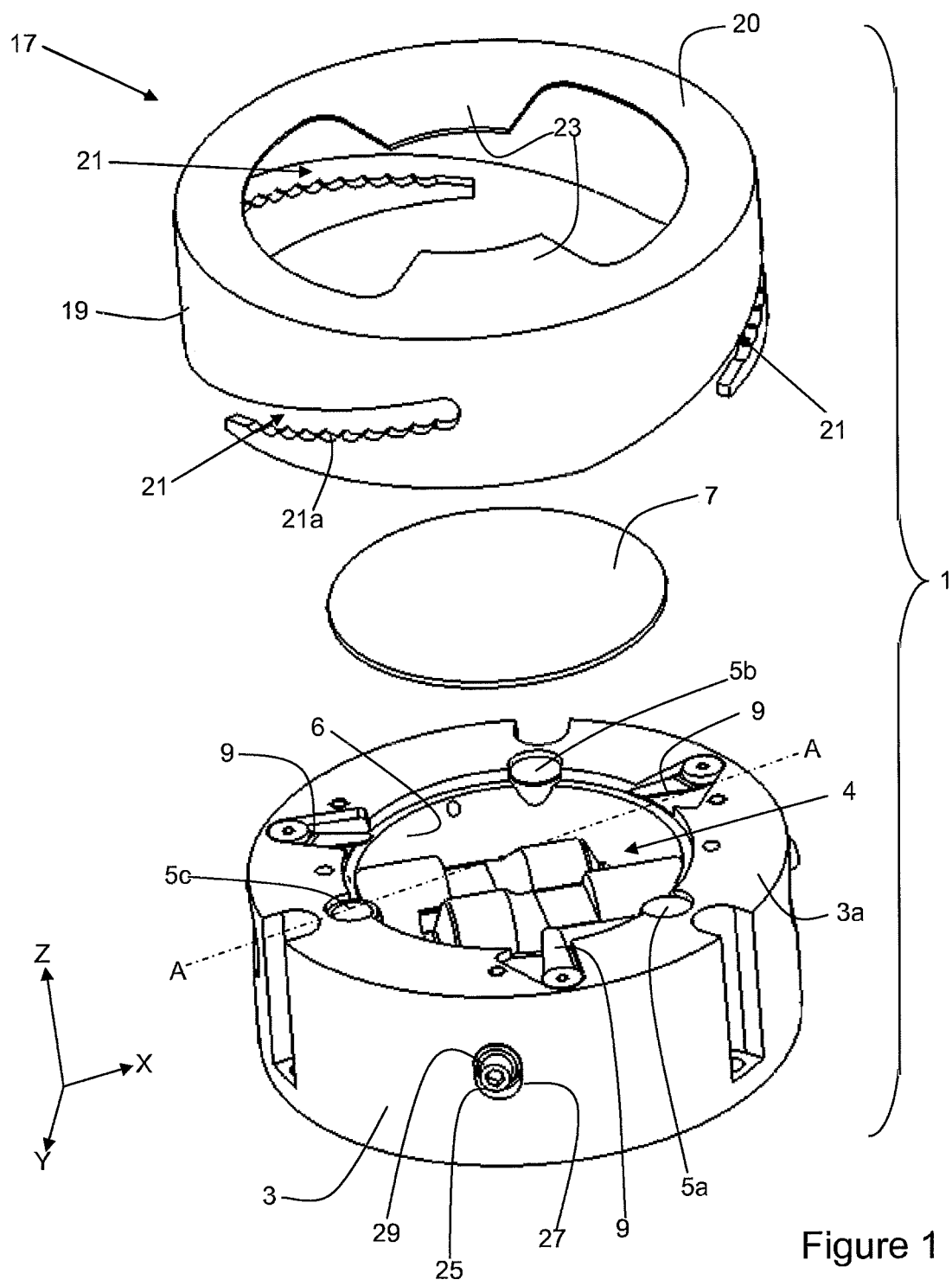
FIG. 1 is a perspective exploded view of a sample holder comprising both aspects of the invention.

FIG. 1 illustrates a sample holder 1 according to the various aspects of the invention. These aspects can be applied together or separately. In the following description, "up" and "down" are used with respect to the orientation of the elements as illustrated, parallel to the "Z" axis, which is also the axis of movement of the indenter stylus (not illustrated). "Up" therefore means "towards the indenter (not illustrated) along its axis of action", and "down" refers to the opposite direction. The sample holder 1 is adapted for use with an indentation test machine or other type of test machine such as an optical testing machine, a microscope or similar, the other components of which are known and need not be illustrated.

Sample holder 1 comprises a body 3, illustrated here as being of hollow, substantially cylindrical form, and having an end face 3a intended to face an indenter (not illustrated) and situated in a plane perpendicular to the axis Z of action of said intender. However, polygonal or other forms are also possible. In the case of a heated sample holder, one or more heat sources 4 such as infrared heaters, halogen lamps or similar may be provided in the hollow part of the body 3, in front of a reflector 6, which may be of any convenient form such as parabolic or ellipsoidal. In the case of a non-heated sample holder, the body 3 need not be hollow and can thus be solid.

A plurality, ideally three, sample plate supports 5a, 5b, 5c are provided on the body 3, distributed around the body 3 so as to support a sample plate 7, which rests on the ends of the supports 5a, 5b, 5c. Sample plate 7 is intended to receive a sample (not illustrated) either glued, clamped, bolted or simply rested thereon. Sample plate 7 may be constructed of any convenient material and be of dimensions sufficient to lend it sufficient structural strength to withstand the forces of the material test to be carried out without unduly flexing or breaking. In the case of a heated sample holder 1, sample plate 7 may be of heat conducting material such as molybdenum and/or infrared transparent material such as quartz. A heat conductivity of at least 100 W/mK and/or an infrared transmissivity or absorption (as appropriate) of at least 50%, or at least 60% or at least 70% in the range of 780-1500 nm wavelength is usually considered sufficient.

Sample plate 7 is maintained in position in such a manner as it can be rotated against friction by a user by means of a plurality (three in the illustrated case) of retaining elements, illustrated in the form of spring clips 9, which urge sample plate 7 against the sample plate supports 5a, 5b, 5c. However, any convenient clamping arrangement can be provided as an alternative retaining element. Using such a clamping arrangement is to hold the sample plate 7 against three sample plate supports 5a, 5b, 5c is superior to for instance the bolts of CN 103 852 423, since improper application of the clamping arrangement 9 cannot over-stress the sample plate 7, and thus cannot leave it loose, warp it or break it. Furthermore, in this arrangement only one of the sample plate supports 5a, 5b, 5c needs to be adjustable (see below), which simplifies adjustment for the user as opposed to four bolts which require adjustment by pairs.

In the illustrated embodiment, the sample plate supports 5a, 5b, 5c are substantially cylindrical with end faces perpendicular to their sides, however they may also have rounded ends where appropriate, or take on other forms such as ball bearings or surfaces integrated into the body 3, or any convenient combination thereof. However, at least one of the sample plate supports 5c is an adjustable support, adjustable in the Z direction, i.e. perpendicular to the plane of the body 3. The remaining sample plate supports 5a, 5b are of fixed position with respect to body 3. To ensure that the fixed supports 5a, 5b have their end surfaces in the same plane, one or both of the supports may be adjustable at the factory during assembly and then permanently fixed so as to not be user adjustable.

As illustrated, the adjustable sample plate support 5c comprises a tube sitting atop a flat-headed bolt 11 with a threaded section 11a of smaller diameter than its head 11c, the threaded section 11a engaging with a corresponding female thread 11b provided in the body. The bolt 11 comprises an engagement portion 8 for a tool. Alternatively, the tube section of the adjustable sample plate support 5c may be formed integrally with the flat-headed bolt 11 as a single piece so as to form a blind tube with the engagement portion 8 for a tool situated at its inner extremity. In order to give access for a tool such as a screwdriver, hex wrench, Torx wrench or similar, the tube portion of sample plate support 5c is hollow. Situating the engagement portion 8 at the bottom of such a tube reduces the risk of damage of the end face of sample plate support 5c which comes into contact with the sample plate 7. Although providing such an engagement portion for a tool on the outer extremity of the sample plate support 5c is possible as an alternative, there is risk of damage of the end face by inadept use of the tool, which can affect the correct positioning of the sample plate 7. Hence, adjustable sample plate support 5c can be adjusted up and down in the Z direction by screwing it in or out, thereby tilting the sample plate 7 with respect to the body 3 which, in combination with the fact that the sample plate 7 can be rotated manually, enables compensating non-parallel faces of the sample without having to finely balance opposing bolts, whose relative lengths may be subject to change upon heating in the case of a high-temperature materials test.

This principle is illustrated schematically in FIG. 3, in which the adjustable support 5c is represented on the left, and the fixed supports 5b, 5b are represented schematically with the element indicated. Firstly, adjustable sample plate support 5c is set at the same height as the fixed supports 5a, 5b. Then, a sample 13 with non-parallel faces is placed on the sample plate 7, e.g. by gluing, and is rotated (either on its own or together with the sample plate 7 if glued thereupon) until its thinnest point faces adjustable sample plate support 5c. The position of the sample plate 7 and/or the sample can be marked if required. Then, adjustable sample plate support 5c is then unscrewed until the upper face of the sample 13 is perpendicular to the Z direction. In the illustrated embodiment, this may require removal of the sample plate 7 to access the adjustable sample plate support 5c and careful measurement and/or trial and error. However, the position of the supports 5a, 5b, 5c and the diameter of the sample plate 7 can be arranged so as to provide tool access around the periphery of the sample plate 7. Such an arrangement is indeed illustrated in FIG. 2. Alternative arrangements of adjustable sample plate support 5c which can be accessed without removing sample plate 7 or requiring access from the upper side of the sample holder 1 such as rack and pinion or cam-based systems controlled laterally from the side of the body 3 are also possible. In particular, a bolt with a conical cam surface at its extremity in contact with the lower end of support 5c, the bolt penetrating laterally into the body 3 and accessible from outside would be a good arrangement. Screwing the bolt in would thus raise support 5*c* without the need to remove the sample plate 7.

As a result, the surface of the sample 13 which will interact with the materials test device 15 is perpendicular to the Z axis, along which the indenter stylus 15 operates.

Figure 4:
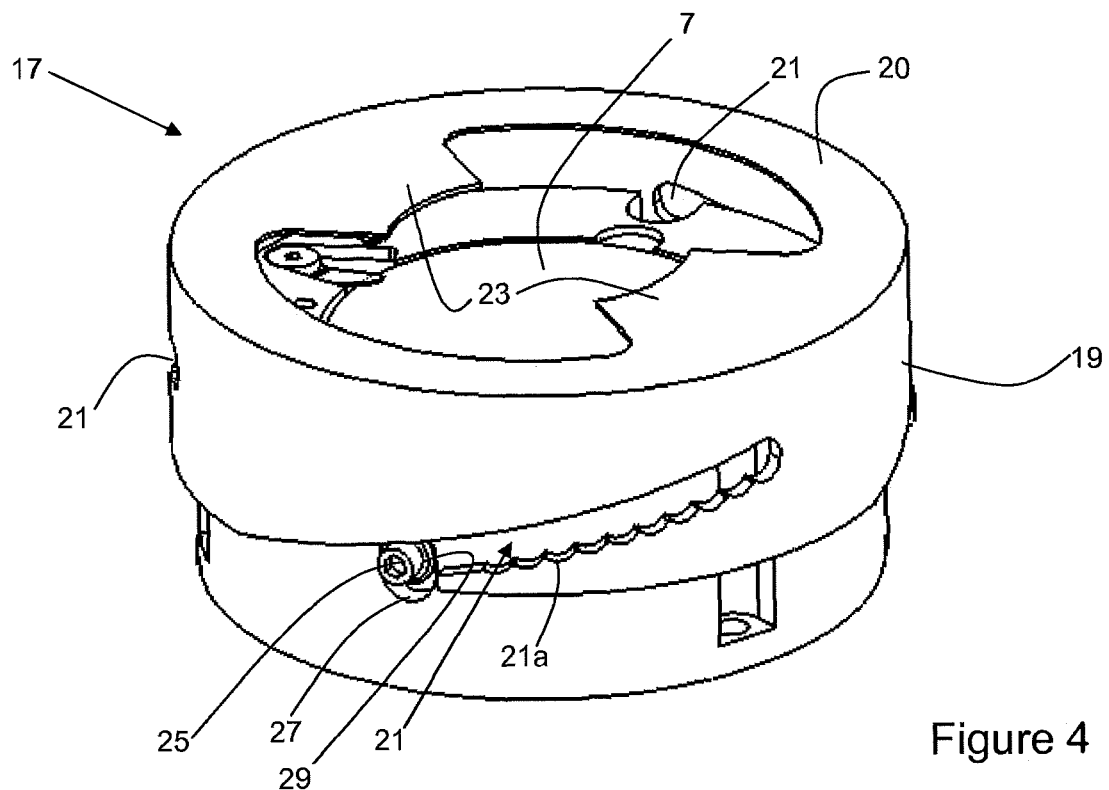
FIG. 4 is a perspective view of the sample holder with the clamping ring in the process of being engaged.
Figure 5:
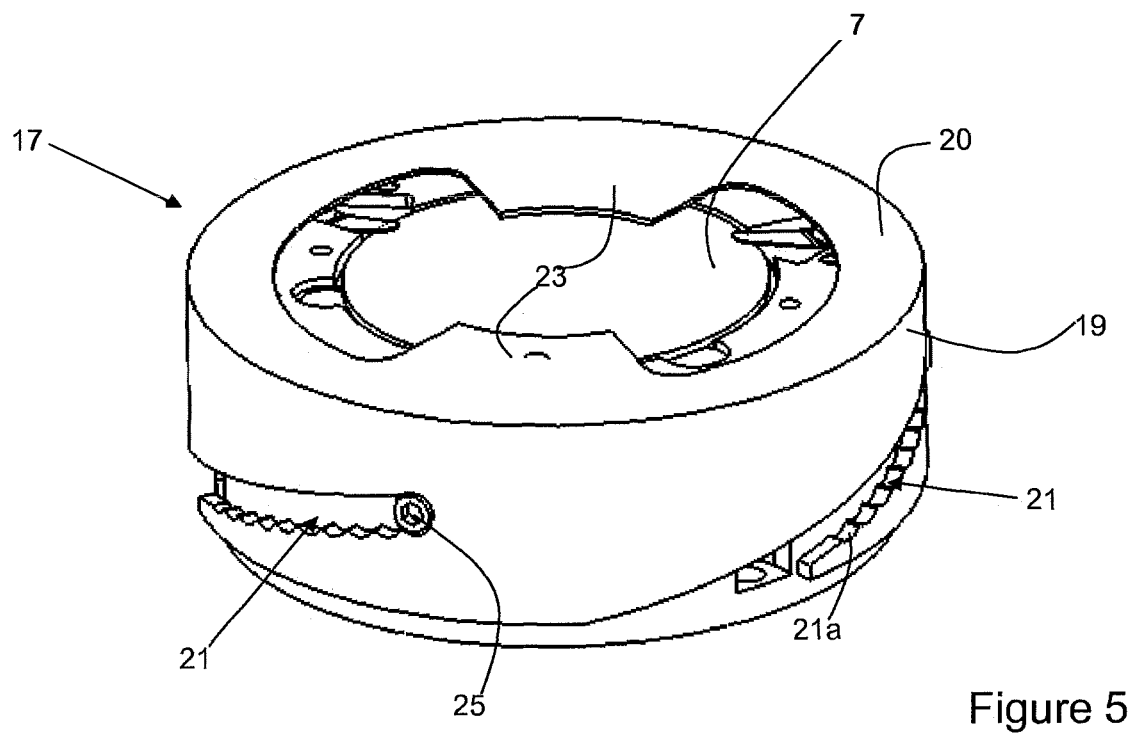
FIG. 5 is a perspective view of the sample holder with the clamping ring fully engaged.

Another aspect of the invention relates to a clamping arrangement comprising a clamping ring 17, which can be utilised in combination with the adjustable sample plate support 5*c*, or independently thereof, as is shown on FIGS. 1, 4 and 5.

Clamping ring 17, typically made of metal, comprises a cylindrical portion 19 sized to fit over body 3, and an annular flange 20 extending inwardly from an extremity of the cylindrical portion 19. Flange 20 comprises a plurality of resilient tongues 23 extending towards the geometric centre of the flange. Two tongues 23 are illustrated in the figures, however three, four or a larger number are also possible. The tongues are adapted to come into contact with the sample (not illustrated on FIGS. 1, 4 and 5) and to clamp it against the sample plate 7. This also serves to clamp the sample plate 7 in position on the sample plate supports 5*a*, 5*b*, 5*c*.

In order to provide the clamping force required, the cylindrical portion 19 comprises a plurality of helical slots 21, each comprising a plurality of notches 21*a* provided on the edge of the slot situated away from the flange 20. These notches 21*a* are arranged to interact with corresponding studs 25 provided on the body 3 of the sample holder 1. Three slots 21 are illustrated, however two, four, five or even more slots may be used. Furthermore, although the slots 21 are illustrated as extending through the entire thickness of the cylindrical portion 19, they can also be formed as grooves situated on the inner wall of the cylindrical portion 19 and extending only through part of its thickness.

In use, the sample is placed on the sample plate 7, and then the clamping ring 17 is placed over the body 3, the helical slots 21 being aligned with their corresponding studs. The clamping ring 17 is then simultaneously pushed down and turned so as to cause the tongues 23 to come into contact with and thus to clamp the sample on the sample plate 7 with the desired force, the tongues being thereby flexed, which provides the clamping force. Upon releasing the clamping ring 17, the studs 25 engage with the nearest notch 21*a* and prevent the clamping ring from turning and thereby coming loose.

Such an arrangement is particularly useful in the case of a sample holder 1 intended to be used at high temperatures, since the clamping of the sample is relatively unaffected by changes in temperature, and is thus unlikely to come loose during a high temperature material test. Furthermore, this system automatically compensates for the thickness of the samples and can apply varying forces depending on which notch 21*a* of each slot 21 is engaged with the respective studs 25. Finally, clamping ring 17 can be shaped so as to form a heat shield and/or reflector so as to be able to influence and improve the distribution and transmission of heat in and around the sample holder 1.

Although in their simplest form, the studs 25 can simply be pressed or screwed into the body 3, the illustrated embodiment shows a more refined arrangement which permits fine adjustment of their position parallel to the Z direction. This arrangement is illustrated on FIG. 2.

As illustrated, the studs 25 are hex-head bolts which are placed in slots 27 provided in the body 3, these slots 27 extending parallel to the Z direction. An annular bushing 29 is provided around the shank of the stud, this bushing 29 being sized so as to fit the width of the slot 27 and so as not to protrude beyond the outer surface of the body 3. The extremity of the shank of the bolt is threaded into a further bushing 31 threaded onto the shank of an adjustment bolt 33 which extends substantially perpendicular to the stud 25 along a cylindrical cavity 35 provided to this effect. Turning adjustment bolt 33 causes further bushing 31, which is threaded thereupon, to move along the adjustment bolt 33 in one direction or the other, and thereby to displace the corresponding stud 25 up or down in its slot 27 so as to regulate its position.

The invention claimed is:

1. Sample holder for a material testing device, said sample holder comprising:
    a holder body having an end face defining a plane;
    a sample plate arranged at said end face of the holder body and arranged to receive a sample;
    a clamping arrangement;
    wherein said clamping arrangement comprises a clamping ring comprising:
    a cylindrical portion sized to fit over said holder body;
    an annular flange extending inwardly from an extremity of the cylindrical portion;
    a plurality of resilient tongues extending inwardly from said annular flange;
    a plurality of helical slots distributed around the cylindrical portion and each arranged to interact with a corresponding stud provided on said holder body, each helical slot comprising a plurality of notches provided at the edge of the slot situated away from the flange.

2. Sample holder according to claim 1, wherein each of said plurality of helical slots extends through the entire thickness of said cylindrical portion.

3. Sample holder according to claim 1, wherein each of said studs is adjustably arranged in a corresponding slot in the holder body, said slot extending perpendicular to said plane.

4. Sample holder according to claim 3, wherein each of said studs is mounted to a bushing threaded onto a bolt situated in a cavity provided in said holder body, said bolt extending along the corresponding cavity in a direction perpendicular to said plane.

5. Sample holder according to claim 1, wherein said holder body is hollow and comprises a reflector facing said sample plate and at least one heating element situated between said reflector and said sample plate.

6. Sample holder according to claim 1, said sample holder comprising:
    at least three supports disposed around said end face of the holder body and arranged to support the sample plate thereupon, at least one of said supports being an adjustable support arranged to be adjustable in position with respect to said holder body in a direction perpendicular to said plane;
    wherein at least one retaining element is provided on the holder body, said retaining element being arranged to retain the sample plate against said supports.

7. Sample holder according to claim 6, wherein said adjustable support is threaded into said holder body and arranged so as to be adjusted by screwing said adjustable support in or out.

8. Sample holder according to claim 7, wherein said adjustable support is formed either as a blind tube at an end intended to support the sample plate, an engagement portion for a tool being provided at the inner extremity of said tube, or as a tube resting upon a bolt, said bolt being provided with an engagement portion for a tool.

9. Sample holder according to claim 6, wherein said holder body is hollow and comprises a reflector facing said sample plate and at least one heating element situated between said reflector and said sample plate.

10. Sample holder according to claim 6, wherein said retaining element is arranged to permit the sample plate to be rotated under friction.

11. Sample holder according to claim 10, wherein said retaining element is a spring clip.

12. Sample holder according to claim 6, comprising exactly three of said supports, wherein only one of said supports is an adjustable support.

13. Sample holder according to claim 12, wherein end faces of two of said supports are not adjustable and are situated in substantially the same plane.

14. Sample holder according to claim 6, wherein the sample plate rests upon the ends of said supports.

15. Indentation test machine comprising a sample holder according to claim 6.

16. Indentation test machine comprising a sample holder according to claim 1.

17. Sample holder for a material testing device, said sample holder comprising:
- a holder body having an end face defining a plane;
- a sample plate arranged at said end face of the holder body and arranged to receive a sample;
- at least three supports disposed around said end face of the holder body and arranged to support the sample plate thereupon, at least one of said supports being an adjustable support arranged to be adjustable in position with respect to said holder body in a direction perpendicular to said plane;
- wherein at least one retaining element is provided on the holder body, said retaining element being arranged to retain the sample plate against said supports; and
- wherein (i) said holder body is hollow and comprises a reflector facing said sample plate and at least one heating element situated between said reflector and said sample plate, or
- (ii) said retaining element is arranged to permit the sample plate to be rotated under friction, or
- (iii) both (i) and (ii).

18. Sample holder according to claim 17, wherein (i) said holder body is hollow and comprises a reflector facing said sample plate and at least one heating element situated between said reflector and said sample plate.

19. Sample holder according to claim 17, wherein (ii) said retaining element is arranged to permit the sample plate to be rotated under friction.

20. Sample holder according to claim 19, wherein said retaining element is a spring clip.

* * * * *